Oct. 5, 1965          G. W. BARNETT          3,210,545
METHOD OF COMPENSATING A RADIATION GAUGE FOR UNWANTED
CHANGES IN MEASURED MATERIAL
Filed July 24, 1961

INVENTOR.
Glenroy W. Barnett
BY
Anthony D. Cennamo
ATTORNEY 3,210,545
METHOD OF COMPENSATING A RADIATION GAUGE FOR UNWANTED CHANGES IN MEASURED MATERIAL
Glenroy W. Barnett, Columbus, Ohio, assignor to Industrial Nucleonics Corporation, a corporation of Ohio
Filed July 24, 1961, Ser. No. 126,025
6 Claims. (Cl. 250—83.3)

This invention relates generally to industrial process gauging and particularly to an improved method and apparatus for gauging an industrial process to obtain a measurement of one property independent of the effect of another property which may vary and affect the desired measurement.

Absorption type measurements have been used extensively in the past to obtain measurements which are representative of thickness or density or some related physical property of the material which is passing through a continuous industrial process. The basis for these measurements is generally the absorption which penetrating radiation experiences as it passes through any given material where the absorption is related to the mass of the material per unit area of the radiation beam. As long as all other properties of the material remain constant, the mass per unit area will be directly related to the thickness of the material through which the beam passes. The relation between the radiation which passes through the material and the thickness of the material under these circumstances is an inverse one since the thicker the material the more radiation is absorbed and hence the less radiation emerges from the opposite side of the material to be detected by a suitably located detector.

In certain instances, such as where it is inconvenient to have apparatus located on both sides of the material or where the material is too thick to be penetrated by the radiation, a form of measurement known as a back-scatter gauge is employed in which the moving material is irradiated by radiation which penetrates into the material and produces a secondary radiation caused by interaction with the atoms of the material penetrated. This secondary radiation can be detected by a suitably located detector on the same side of the material as the radiation source. The amount of back-scatter radiation is generally directly proportional to the thickness of the material since the longer the path through the material which the penetrating radiation must traverse the more chance there is for interaction with the atoms of material and the production of back-scatter radiation.

The two types of measurements, as provided for by these prior art devices, produce signals which vary inversely with each other, the one being inversely proportional to thickness, and the other directly proportional to thickness. These two measurements have been combined heretofore, as disclosed in British Patent No. 763,-667, to obtain opposing signals which nullify each other for a predetermined thickness of the material being measured. Variations in the thickness of the material in the system of this British patent will thus produce a preponderant signal in either the penetrating or back-scatter detector which signal can be calibrated as being an increase or decrease in the thickness of the material from a predetermined standard thickness.

The various forms of gauging apparatus in present use operate on the assumption that the composition of the material being measured does not vary or at least does not vary in any characteristic which will effect the reading of the instrument. While this may be true for some changes in certain properties of the material, changes in other properties do produce a variation in the detected signal which is generally indistinguishable from the variations in the signal produced by changes in thickness. For the penetrating type gauge a change in composition which produces more attenuation will result in an increase in the signal in the back-scatter type gauge due to greater secondary radiation. Thus, in combining signals from two types of gauges such as disclosed in the afore mentioned British patent a change in composition would produce a double increment in the reading of the gauge since the two signals would vary with opposite sense and the subtraction of such signals would make the total signal increment additive. In either a combined measurement scheme, such as disclosed in the British patent or a single penetrating or back-scatter type gauge, the variations produced in the signal due to composition changes are, in effect, inaccuracies since the gauge reading will be interpreted as thickness since the apparatus as heretofore used is calibrated in terms of thickness with the assumption that composition changes will not occur or produce no change. It is, however, well known that such composition changes do occur and that these changes effect the gauge reading.

The U.S. patent to Gough 2,988,641 shows an arrangement of two back-scatter gauges for providing a composition compensated measurement.

The present invention provides an arrangement for improving the accuracy of the reading obtained from thickness measuring apparatus which employs penetrating radiation by developing a correctional factor derived from two simultaneous measurements of the material. Two independent signals may be obtained by using two gauges, one a penetrating type gauge such as a beta-ray gauge, and the second a back-scatter gauge in which secondary radiation from the material being irradiated is detected and a signal developed which varies directly with the thickness of the material. The present invention utilizes two simultaneous measurements of the penetrating and back-scatter type for developing signals which can be combined to produce a thickness measurement which is independent of a variation in a property of the material which would produce an increment of signal indistinguishable from a thickness change in either measurement when taken alone. Thus if a composition change, such as a change in the pigment in a plastic or the like, changes the attenuation characteristics of the material such that the signal in a penetrating type gauge decreases, the corresponding back-scatter gauge will be found to have an increased signal since the greater absorption of energy occurs with a greater secondary radiation for the back-scatter gauge to detect.

The relations between the variables involved and the signals derived by two such gauges is complex but for any given industrial process the operation will be carried on with respect to the specification for the material being produced or processed and, hence, all variables will be detected as changes from a desired nominal value. Since these changes will be relatively small if the process is producing material within the limit set on the variations in the specification, variations within this range may be considered to be linearly related and a set of linear equations can be found relating the variables with the signals detected. Under these conditions a simple simultaneous equation solver may be provided to receive the two signals detected from a penetrating and back-scatter gauge for solving simultaneous relations previously determined for the operating point of the process and produce a thickness measurement which is compensated for any variations that may occur in another property of the product.

In order to establish the linear relations between the variables and the detected signals it will generally be necessary to have calibrating samples of the material with varying thickness and varying composition both corresponding to the thickness and composition variations which are normally expected in the production process. By knowing the composition and the thickness for a range of samples in the linear region in the operating point the signals obtained in both the penetration type detector and the back-scatter detector can be observed and the equations relating the variables solved for the coefficients thereof in accordance with conventional simultaneous equation solution practice. Once these coefficients have been established for a given range of the variables, the computer can be calibrated with these coefficients, and the signals obtained during an actual production process applied to the computer for the computation of the thickness variable. If desired, the variation in the other property can also be solved for by the simultaneous solution of the equations. While special instances may exist where a simple relation exists among the variables and, hence, a simple computational formula can be derived permitting a single equation to be solved without the necessity for simultaneous equations, the present disclosure will be made in terms of the solution of simultaneous equations in order that it may be completely general. It will be understood, however, that the instances where specific relations among the variables permit a single formula solution to be achieved are within the scope of this invention.

It is accordingly the primary object of the present invention to provide an improved industrial process gauge which measures a characteristic of the material in the process and produces an indication corrected for variations of another property of the material.

Another object of the invention is to provide a combined penetrating and back-scatter measurement of a single product to obtain a measurement of a characteristic of that product with improved accuracy.

An additional object of the invention is to improve the thickness measurement obtained by an absorption type radiation gauge by means of a signal derived by a back-scatter measurement of the same material.

These and other objects of the invention will be apparent from the following detailed description taken in conjunction with the accompanying drawings wherein.

Figure 1:
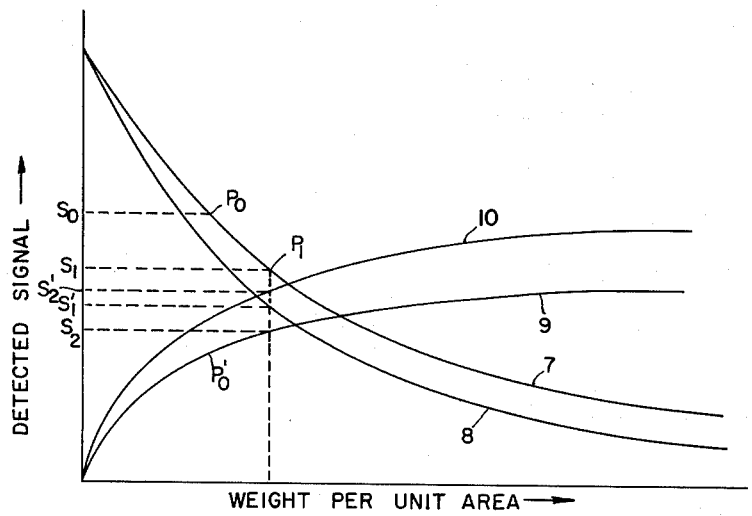
FIG. 1 is a graph for both absorption and back-scatter gauges showing the relation of detected signal to thickness with variation in material composition as in parameter.

Referring now to FIG. 1, a characteristic curve 7 is plotted showing the relation between detected signal $S_1$ as a function of the weight or mass per unit area of the material which is irradiated in a conventional penetrative radiation gauge, such as a beta-ray density gauge. For a standard thickness of material in the gauge, a fixed operating point $P_0$ will exist corresponding to that weight of the material for the particular standard thickness and a signal $S_0$ will be produced which is the on specification signal of the process. Since variations will occur in the continuous industrial process, the actual signal $S_1$ which is instantaneously measured by the gauge will correspond to the point $P_1$ for the weight per unit area corresponding to the instantaneous thickness of the material.

If some other property of the material which effects the absorption of radiation should vary, such as a change in the composition of the material, a second relation between the variables will be obtained such as the curve 8 which is generally similar in shape to the characteristic curve 7 but displaced therefrom. Thus for any range of variations in such a variable, a family of curves similar to 8 but displaced from curve 7 will be obtained and the corresponding signal $S'_1$ detected therefrom will be different from the signal detected if the characteristic 7 were involved. In the example shown the signal which would be measured if the characteristic 8 represented the material of changed composition would be the signal $S'_1$ corresponding to the point on characteristic curve 8 directly below the point $P_1$.

For a back-scatter gauge a characteristic 9 will be found to define the relation between the detected signal $S_2$ and the weight per unit area of the material. The value $S_2$ on curve 9 changes to the value $S'_2$ on curve 10 when the composition changes corresponding to the change from characteristic 7 to characteristic 8 previously described. As can be seen the changes from $S_1$ to $S'_1$ and the change from $S_2$ to $S'_2$ are in opposite directions and different magnitudes are derived from the independent characteristics defining the relations between the variables for the two types of gauges.

In accordance with the invention, the foregoing relations between the variables are utilized at the specification values for the product in the process to derive the following two independent linear equations:

$$Y_1 = A_{11} + A_{12}S_2 \quad (1)$$
$$Y_2 = A_{21}S_1 + A_{22}S_2 \quad (2)$$

In the above equations $Y_1$ is a quantity related to the thickness of the material and $Y_2$ is a quantity related to composition. The values $S_1$ and $S_2$ are the measured signals obtained respectively from the transmission and back-scatter gauges, and the coefficients $A_{ij}$ are determined by experimental variations of the quantities $Y_1$ and $Y_2$ and measuring the corresponding $S_1$ and $S_2$. Thus the coefficients of Equation 1 can be found by varying by a known increment the thickness of the material in the vicinity of $P_0$ the operating point of the process while the composition remains constant. Two or more measurements may be made for different values of $Y_1$ in order that both coefficients $A_{ij}$ may be calculated.

A similar calculation is made for known values of $Y_2$ by varying the composition or other characteristic which produces a signal change while maintaining the thickness constant. For two or more values of $Y_2$ with the thickness at the specification value for $P'_0$ the constants in Equation 2 can be solved. With the constants $A_{ij}$ in both Equations 1 and 2 established, the simultaneous solution of these equations can be obtained by straightforward means known in the art.

Figure 2:
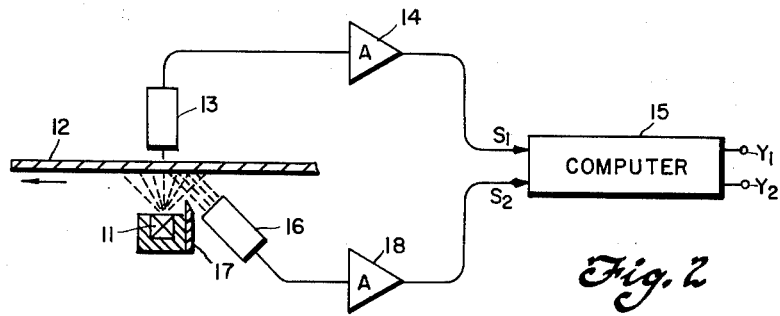
FIG. 2 is a block diagram of a preferred embodiment of the invention.

Referring know to FIG. 2, a schematic ararngement of the invention using a single radiation source 11 to measure a product 12 being produced or modified in a continuous industrial process will be described. The source 11 directs penetrative radiation such as beta-rays at the material 12 and a conventional absorption type measurement is made by a detector 13 positioned on the opposite side of the material 12 from the source 11 to detect that portion of the radiation which penetrates the material 12 and falls upon the detector 13. The detector 13 is connected to suitable power supply and amplifier circuits 14 for producing a signal the magnitude of which is representative of thickness in conventional systems but which nevertheless is subject to variation due to composition or other changes in the material. This signal is $S_1$ which is applied to one input of a simultaneous linear equation computer 15.

Positioned on the same side of the material 12 as the source 11 is a back-scatter gauge detector 16 which generally is provided with a shield 17 to prevent direct radiation from the source 11 reaching the detector 16. The radiation from the source 11 impinging upon the material 12 produces secondary or backscatter radiation from the material 12. The detector 16 ordinarily responds to all of this secondary radiation and as previously described the intensity of the secondary radiation detected by the detector 16 varies directly with the thickness of the material 12. The intensity of secondary radiation also increases with composition changes with produce a decrease in the response of the detector 13 in an absorption type measuring system. The detector 16 is connected to suitable power supply and amplifier circuits 18 to develop a signal $S_2$ which is applied as a second input to the computer 15.

The computer 15 is arranged to solve the linear Equations 1 and 2 simultaneously and produce outputs $Y_1$ and $Y_2$ as quantities representing thickness and composition respectively. Any suitable form of computer 15 can be employed and where a special relation between the quantities exists such that simultaneous equation solving is not required the computer 15 can be replaced by an appropriate function circuit or other operational circuit for operating on the two variables, $S_1$ and $S_2$.

Figure 3:
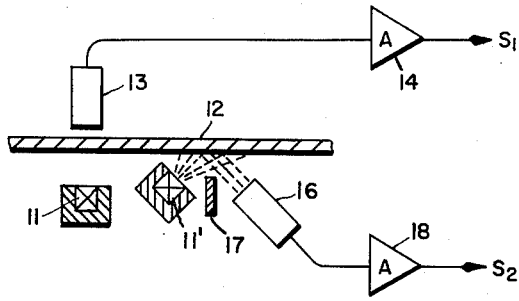
FIG. 3 is a partial block diagram of a modification.

Referring now to FIG. 3 a modification of the embodiment is shown which employs two radiation sources 11 and 11'. Except for this change, the circuit of FIG. 3 operates the same as that described for FIG. 2 with detectors 13 and 16 supplying absorption and back-scatter radiation signals to detectors 14 and 18 to develop the quantities $S_1$ and $S_2$ for application to a computational device. The arrangement of FIG. 3 provides added flexibility since the quantity and type of radiation from the respective sources 11 and 11' can be selected to produce optimum results in the measurements performed in either of the embodiments.

While a particular application of the method and apparatus of the invention has been described, it will be apparent that various modifications thereof may be made by those skilled in the art without departing from the true scope of the invention. Accordingly, the invention is to be considered as including those methods and apparatus which fall within the scope of the appended claims.

I claim:

1. The method of compensating a mass per unit area measurement for changes in composition of the material being measured which changes normally affect the indication produced comprising the steps of,
    passing penetrating radiation through said material,
    detecting radiation passing through said material to develop a first signal having a component representing the mass per unit area of said material and a component representing said composition,
    detecting backscatter radiation produced by radiation impinging on said material to develop a second signal also having a component representing mass per unit area of said material and a component representing said composition, and
    combining said first and second signals in predetermined relation to produce to a corrected signal representative of mass per unit area.

2. The method of compensating a mass per unit area measurement for changes in composition of the material being measured which changes normally affect the indication produced comprising the steps of,
    passing primarily beta rays into said material,
    detecting radiation passing through said material to develop a first signal having a component representing the mass per unit area of said material and a component representing said composition,
    detecting backscatter radiation produced primarily by beta rays impinging on said material to develop a second signal also having a component representing mass per unit area of said material and a component representing said composition, and
    combining said first and second signals in predetermined relation to produce a corrected signal representative of mass per unit area.

3. The method of compensating a thickness measurement for changes in composition of the material being measured which changes normally affect the indication produced, comprising the steps of,
    passing penetrating radiation through said material,
    detecting radiation passing through said material to develop a first signal having a component representing the thickness of said material and a component representing said composition,
    detecting backscatter radiation produced by radiation impinging on said material to develop a second signal also having a component representing thickness of said material and a component representing said composition, and
    combining said first and second signals in predetermined relation to produce a corrected signal representative of thickness.

4. The method of compensating a thickness measurement for changes in composition of the material being measured which changes normally affect the indication produced, comprising the steps of,
    passing primarily beta rays through said material,
    detecting radiation passing through said material to develop a first signal having a component representing the thickness of said material and a component representing said composition,
    detecting backscatter radiation produced primarily by beta rays impinging on said material to develop a second signal also having a component representing thickness of said material and a component representing said composition, and
    combining said first and second signals in predetermined relation to produce a corrected signal rpresentative of thickness.

5. The method of compensating a composition measurement for changes in thickness of a material being measured where said material density is substantially constant which changes normally affect the indication produced, comprising the steps of,
    passing penetrating radiation through said material,
    detecting radiation passing through said material to develop a first signal having a component representing the composition of said material and a component representing the thickness of said material,
    detecting backscatter radiation produced by radiation impinging on said material to develop a second signal also having a component representing the composition of said material and a component representing the thickness of said material, and
    combining said first and second signals in predetermined relation to produce a corrected signal representative of composition.

6. The method of compensating a composition measurement for changes in thickness of a material being measured where said material density is substantially constant which changes normally affect the indication produced, comprising the steps of,
    passing primarily beta rays through said material,
    detecting radiation passing through said material to develop a first signal having a component representing the composition of said material and a component representing the thickness of said material,
    detecting backscatter radiation produced primarily by beta rays impinging on said material to develop a second signal also having a component representing the composition of said material and a component representing the thickness of said material, and
    combining said first and second signals in predetermined relation to produce a corrected signal representative of composition.

References Cited by the Examiner

UNITED STATES PATENTS

| 2,323,128 | 6/43 | Hare | 250—83.3 |
| 2,903,590 | 9/59 | Somerville | 250—83.3 |
| 2,920,206 | 1/60 | Heller | 250—83.3 |
| 2,966,587 | 12/60 | Faulkner | 250—43.5 |
| 2,977,478 | 3/61 | Wuppermann | 250—83.3 |
| 2,988,641 | 6/61 | Gough | 250—83.3 |

FREDERICK M. STRADER, *Primary Examiner.*

RALPH G. NILSON, *Examiner.*